(12) United States Patent
Iriyama et al.

(10) Patent No.: US 6,592,655 B2
(45) Date of Patent: Jul. 15, 2003

(54) AIR CLEANER

(75) Inventors: Akira Iriyama, Kariya (JP); Kouichi Oda, Kariya (JP); Takashi Nishimoto, Toyota (JP)

(73) Assignees: Toyoda Boshoku Corp., Toyoda (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/086,857

(22) Filed: Mar. 4, 2002

(65) Prior Publication Data

US 2002/0124733 A1 Sep. 12, 2002

(30) Foreign Application Priority Data

Mar. 8, 2001 (JP) ........................ 2001-064531

(51) Int. Cl.[7] ..................... B01D 27/08; B01D 53/04
(52) U.S. Cl. ............... 96/138; 55/503; 55/511; 55/385.3; 55/DIG. 31
(58) Field of Search ................ 96/134, 138, 147, 96/151; 55/385.3, 490, 492, 495, 527, DIG. 31, 503, 511; 123/198 E

(56) References Cited

U.S. PATENT DOCUMENTS

| 3,707,046 | A | * | 12/1972 | De Baun | 55/483 |
| 4,438,057 | A | * | 3/1984 | Sundseth | 264/46.5 |
| 4,658,449 | A | * | 4/1987 | Martin | 4/496 |
| 5,030,264 | A | * | 7/1991 | Klotz et al. | 55/481 |
| 5,482,622 | A | * | 1/1996 | Stark et al. | 210/232 |
| 5,620,505 | A | * | 4/1997 | Koch et al. | 96/134 |
| 5,912,368 | A | * | 6/1999 | Satarino et al. | 55/320 |
| 5,935,282 | A | * | 8/1999 | Lin | 55/385.6 |
| 6,214,076 | B1 | * | 4/2001 | Beier et al. | 55/484 |
| 6,383,268 | B2 | * | 5/2002 | Oda | 96/134 |

FOREIGN PATENT DOCUMENTS

| JP | U 61-58676 | 4/1986 |
| JP | A 2001-295710 | 10/2001 |

* cited by examiner

Primary Examiner—Duane Smith
Assistant Examiner—Frank M. Lawrence
(74) Attorney, Agent, or Firm—Oliff & Berridge, PLC.

(57) ABSTRACT

An air cleaner includes at least one more installation hole provided in a resin frame of an adsorbent sheet than there are pins and engaging hooks respectively provided in an upper housing.

9 Claims, 8 Drawing Sheets

AIR CLEANER

INCORPORATION BY REFERENCE

The disclosure of Japanese Patent Application No. 2001-64531 filed on Mar. 8, 2001 including the specification, drawings and abstract is incorporated herein by reference in its entirety.

BACKGROUND OF THE INVENTION

1. Field of the Invention

The invention relates to an air cleaner for adsorbing fuel vapor which leaks out from an air intake system of an internal combustion engine such as a vehicle engine.

2. Description of Related Art

Conventionally, an air cleaner for adsorbing fuel vapor which leaks out from an air intake system of an internal combustion engine, such as a vehicle engine, is generally provided with a housing, which is divided into a first housing and a second housing (also referred to as "case" and "cap"), an element disposed in the housing, and an adsorbent sheet, which is also disposed within the housing, for preventing the fuel vapor from the internal combustion engine from being released into the outside air.

With this type of air cleaner, however, regulations require that the adsorbent sheet be carefully installed so that it will not easily detach from the air cleaner. As a result, it is extremely difficult to remove the adsorbent sheet from the air cleaner when the adsorbent sheet is to be recycled.

Further, with this type of air cleaner, even if the shape of the opening is the same, the way in which the air cleaner attaches to an intake duct, an exhaust duct, and other functional members differ when it is installed in a vehicle. As a result, a plurality of installation portions formed on the first housing or the second housing for fixing the adsorbent sheet are not able to be formed in the same location for different types of air cleaners. Therefore, installation holes in the adsorbent sheet which correspond to these installation portions are set individually, corresponding to the locations of the installation portions. This means that for one type of air cleaner, only an adsorbent sheet which corresponds to that air cleaner can be used. It is therefore desirable to have a common adsorbent sheet that can be used with more than one type of air cleaner.

SUMMARY OF THE INVENTION

It is an object of the invention to provide an air cleaner which enables a common adsorbent sheet to be used, and which facilitates the removal of the adsorbent sheet when it is to be recycled.

According to a first aspect of the invention, an air cleaner is provided with: a housing which is divided into a first housing and a second housing; an element which fits between the first housing and the second housing; an adsorbent sheet fixed in at least one of the first housing and the second housing, in which the periphery of the absorbent sheet is retained by a frame; a plurality of installation holes provided in the frame; and a plurality of installation portions which are provided on at least one of the first housing and the second housing, which fix in the installation holes. Moreover, there is at least one more installation hole than there are installation portions.

Accordingly, because there is at least one more installation hole provided in the frame of the adsorbent sheet than there are installation portions provided on the first housing or the second housing, an installation portion may be located anywhere as long as its location corresponds to one of the plurality of holes. This enables a common adsorbent sheet to be used with air cleaners in which the installation portions are set in different locations. Moreover, because the number of installation holes is greater than the number of installation portions, the adsorbent sheet can easily be removed when it is to be recycled by using a tool and an installation hole that is not being used.

In this aspect of the invention, a plug portion for plugging, among the installation holes, an installation hole in which the installation portion is not fixed may be provided with the element.

Accordingly, plugging, among the installation holes, an installation hole in which the installation portion is not fixed with the plug portion provided with the element prevents fuel vapor from leaking out from the installation hole in which the installation portion is not fixed.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Hereinafter, an embodiment of the invention will be described referring to FIGS. 1 through 8, wherein like numerals refer to like elements.

Figure 1:
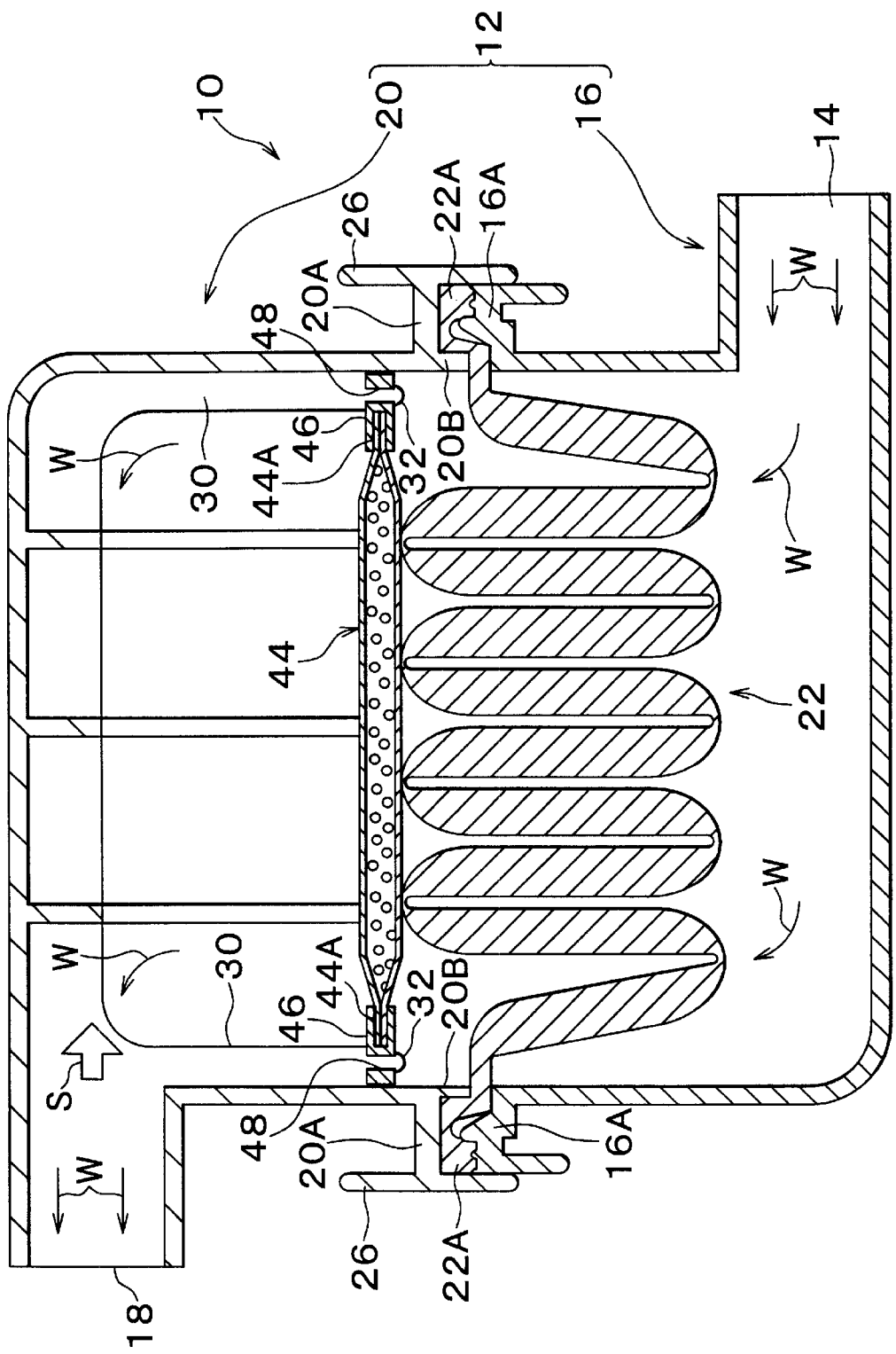
FIG. 1 is a sectional side view showing an air cleaner according to one embodiment of the invention.

As shown in FIG. 1, a housing 12 of an air cleaner 10 according to the present exemplary embodiment is formed of composite resin, and is divided into a lower housing 16 which serves as a second housing having an inlet port 14, and an upper housing 20 which serves as a first housing having an outlet port 18. That is, the upper surface of the lower housing 16 and the lower surface of the upper housing 20 are respectively open.

Figure 3:
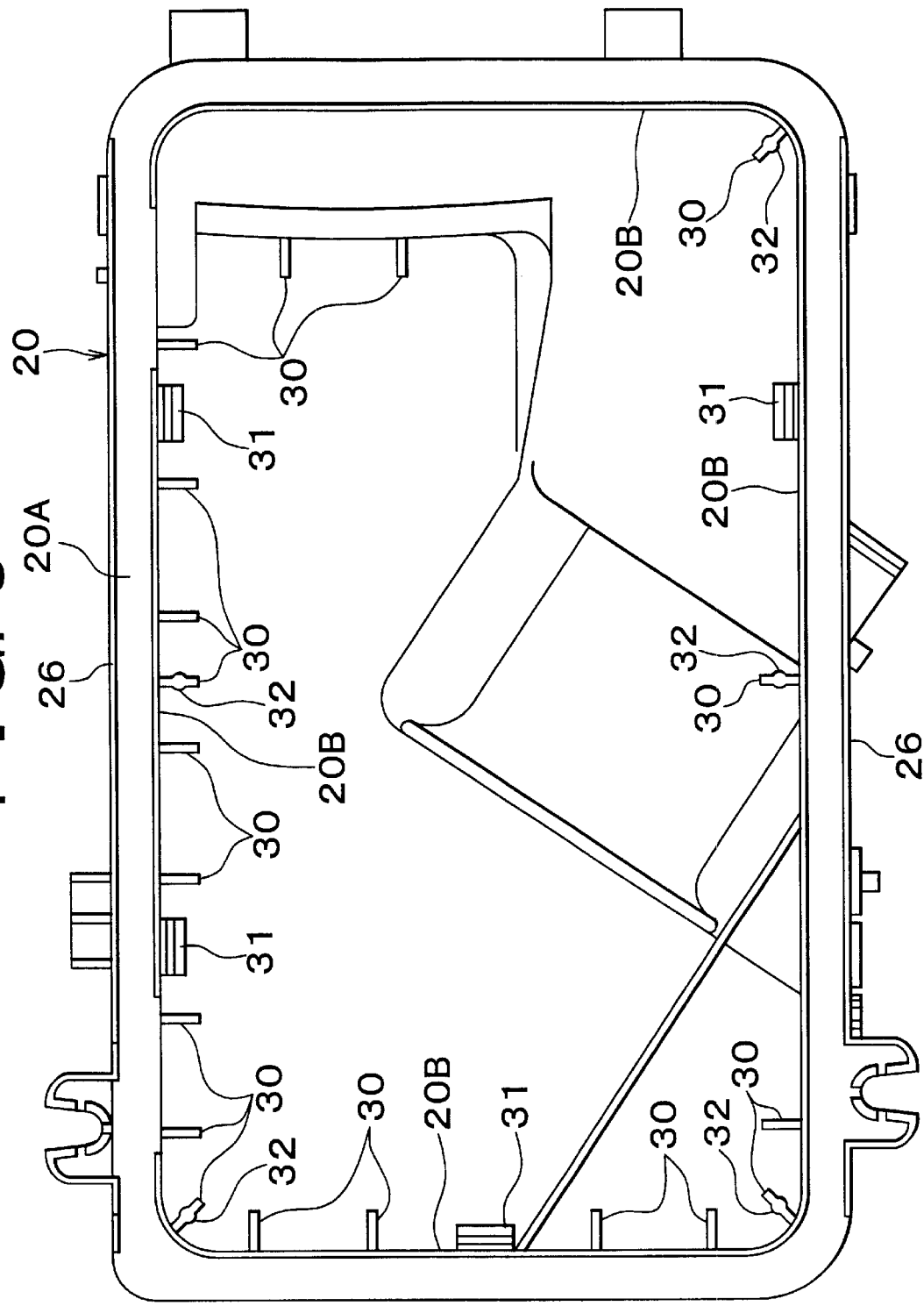
FIG. 3 is a plan view showing an upper housing of an air cleaner according to one embodiment of the invention.

As shown in FIG. 3, along the outer periphery of an open portion 20A of the upper housing 20 is formed a well-known clamp receiver 26. Meanwhile, although not shown, a plurality of well-known brackets are individually formed at predetermined intervals along the outer periphery of an open portion 16A of the lower housing 16. By catching clamps using metal spring material which are attached to these brackets on the clamp receivers 26 of the upper housing 20, the lower housing 16 and the upper housing 20 can be coupled together.

Figure 5:
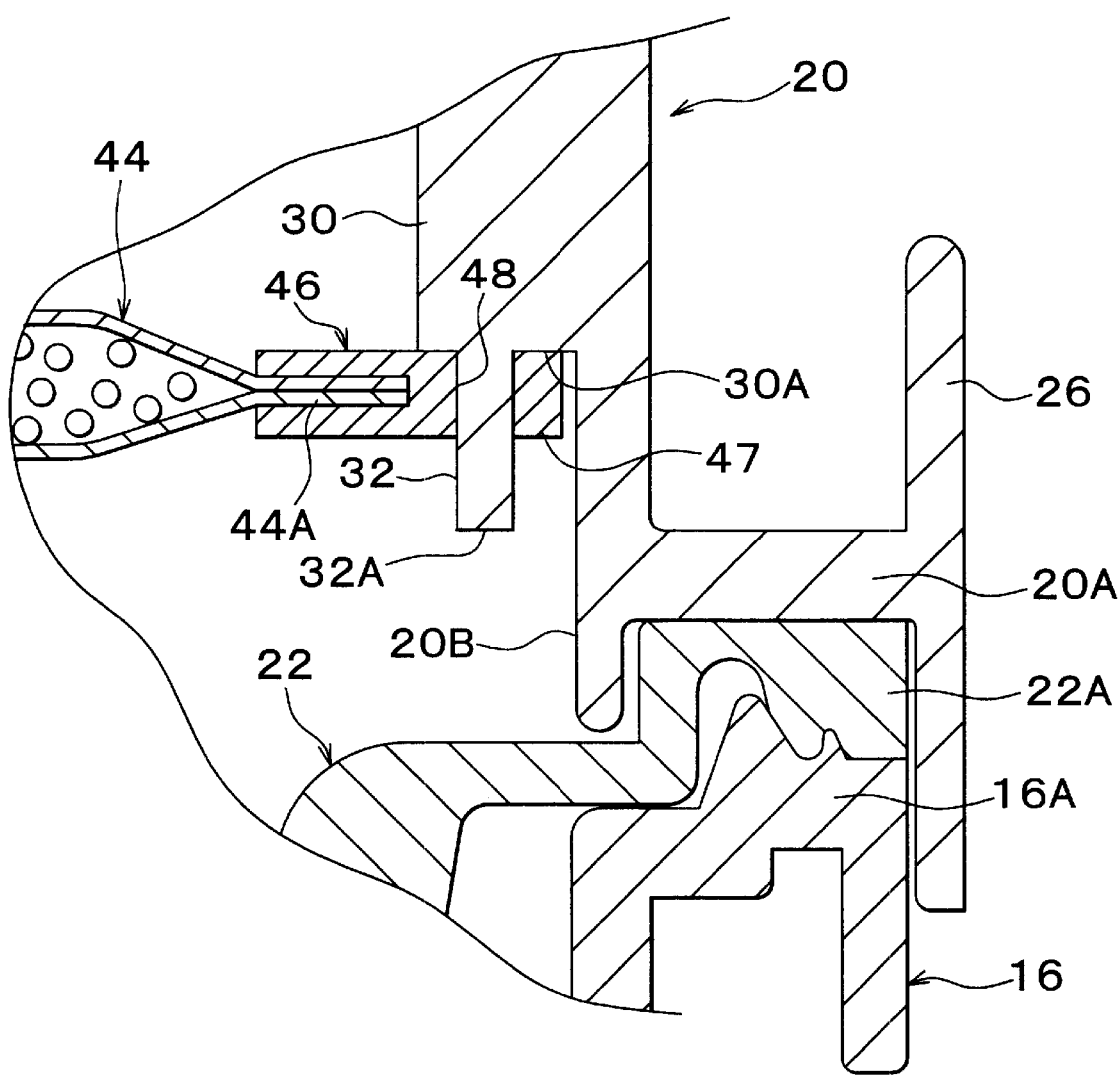
FIG. 5 is an enlarged sectional side view showing a main portion of an air cleaner according to one embodiment of the invention.

As shown in FIG. 5, a rib 30 is formed from an inner wall 20B near the open portion 20A of the upper housing 20 along the flow of intake air (arrow W in FIG. 1) within the upper housing 20.

As shown in FIG. 3, a plurality of these ribs 30 are formed at predetermined intervals along the periphery of the open portion 20A. On some of these ribs 30, a pin 32 for heat caulking is provided vertically as an installation portion.

As shown in FIG. 5, the pin 32 for heat caulking is provided vertically on an end portion 30A on the open portion side of the ribs 30. The pin 32 is inserted into an installation hole 48 provided in a resin frame 46, which serves as a frame for holding an outer periphery 44A of an adsorbent sheet 44.

Figure 4:
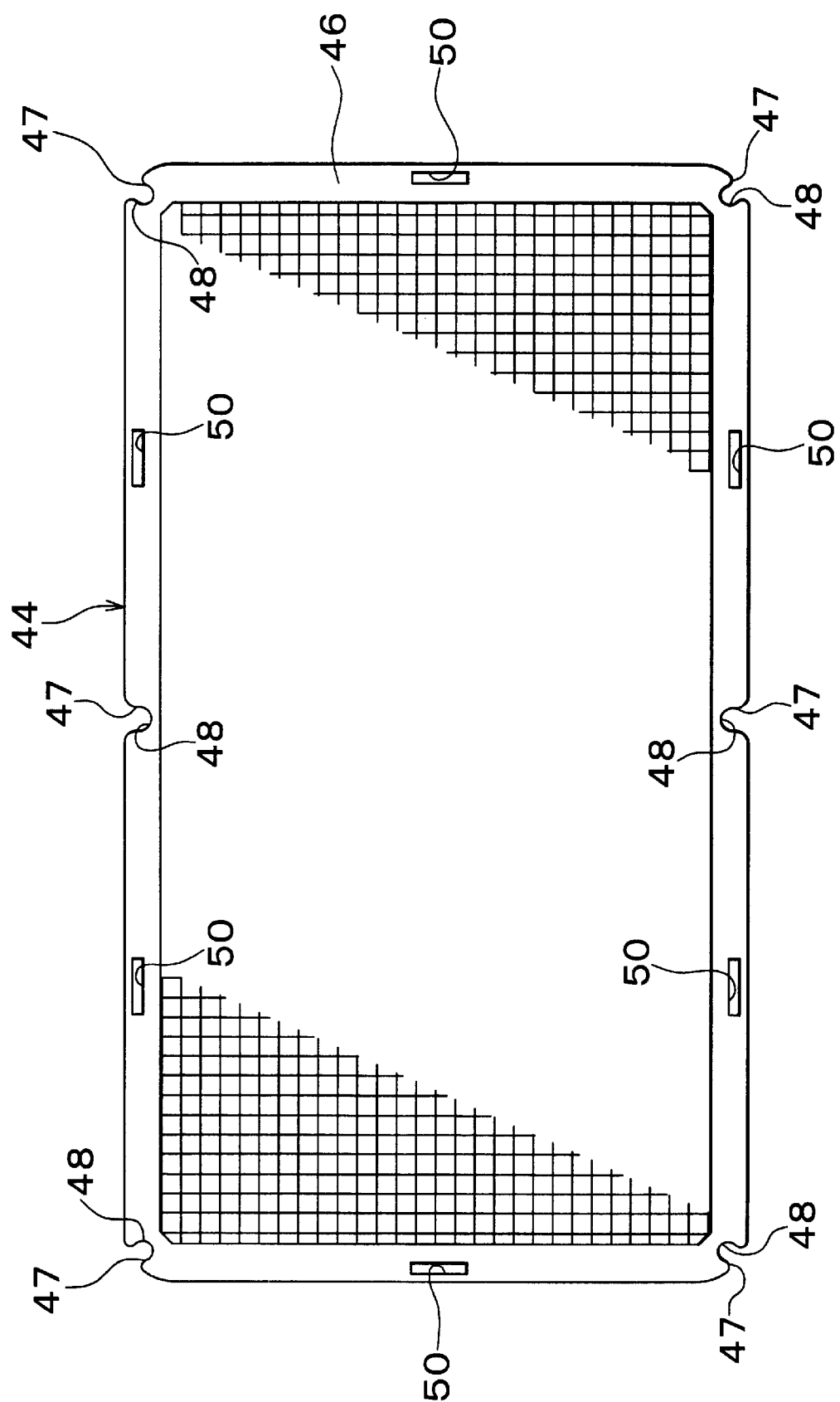
FIG. 4 is a plan view showing an adsorbent sheet of an air cleaner according to one embodiment of the invention.

As shown in FIG. 4, a plurality of installation holes 48 are formed along the periphery of the resin frame 46. Each installation hole 48 has an open portion 47.

Figure 6:
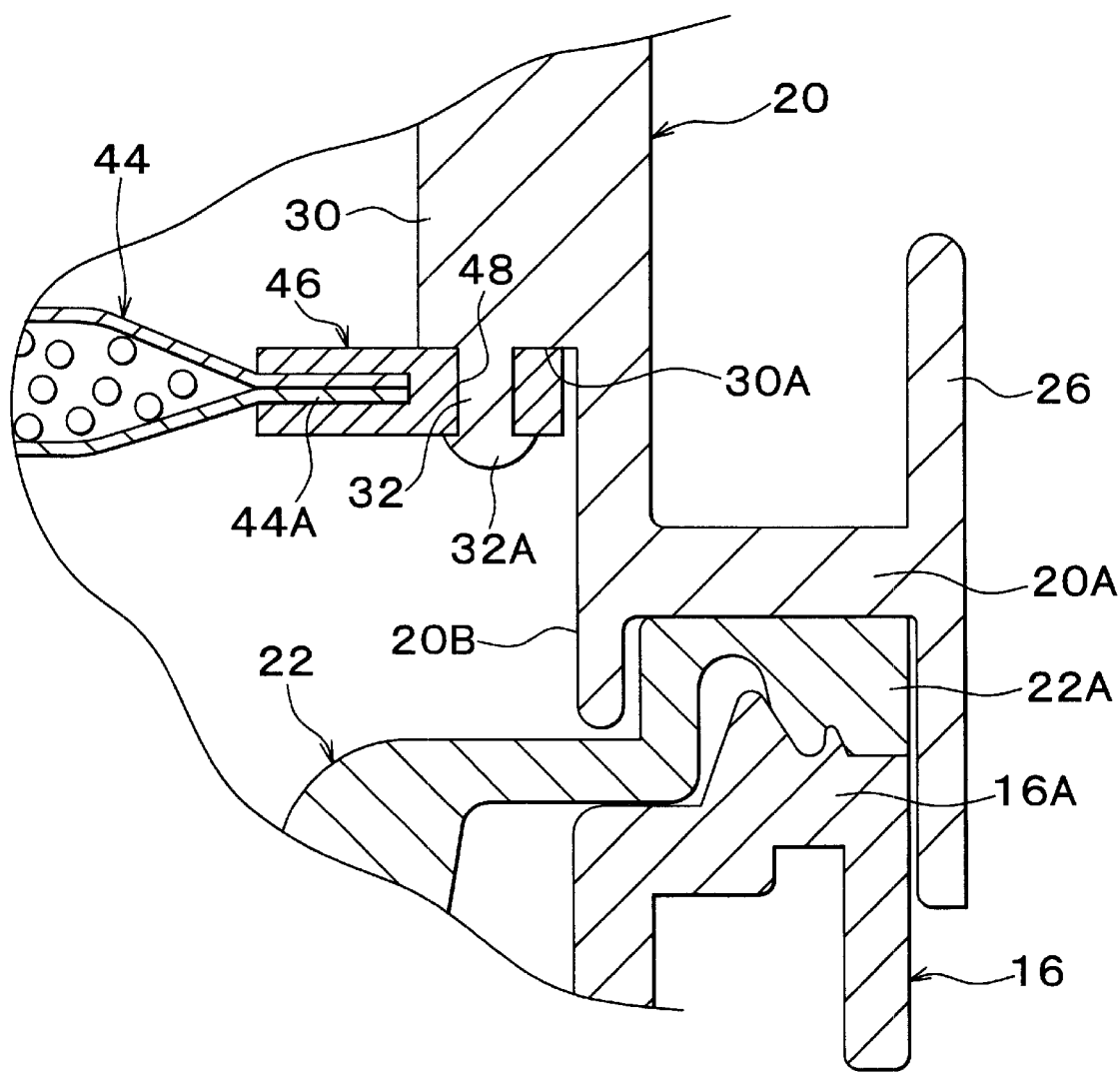
FIG. 6 is an enlarged sectional side view showing a main portion of an air cleaner according to one embodiment of the invention.

As shown in FIG. 6, the pin 32 for heat caulking is such that a tip end portion 32A thereof is able to be heat caulked. The end portion 30A on the open portion side of the ribs 30 becomes a seat portion which receives the resin frame 46 when the adsorbent sheet 44 is installed.

As shown in FIG. 3, a plurality of engaging hooks 31, which serve as installation portions, are formed on the inner wall 20B near the open portion 20A of the upper housing 20, in locations such that they do not overlap with the ribs 30, along the periphery of the open portion 20.

Figure 7:
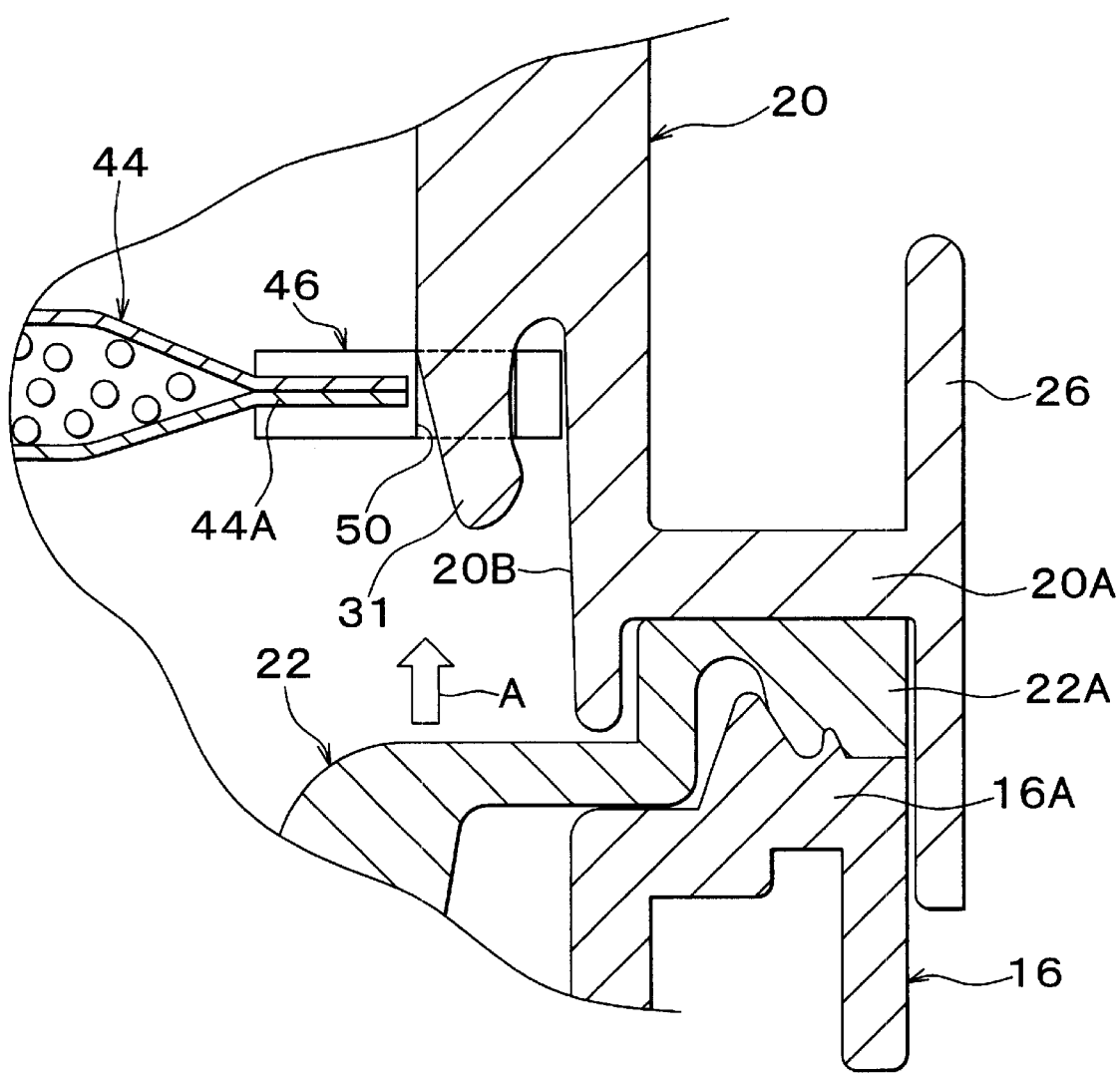
FIG. 7 is an enlarged sectional side view showing a main portion of an air cleaner according to one embodiment of the invention.

As shown in FIG. 7, by pushing the resin frame 46 of the adsorbent sheet 44 upward with respect to the open portion 20A (the direction of arrow A in FIG. 7) of the upper housing 20, the engaging hooks 31 engage with the installation holes 50 formed in the resin frame 46 of the adsorbent sheet 44.

As shown in FIG. 1, on an outer peripheral portion of an element 22 is formed a flexible outer peripheral frame 22A that is made of non-woven fabric and formed integrated with the element 22. This outer peripheral frame 22A is fitted between the open portion 20A of the upper housing 20 and the open portion 16A of the lower housing 16.

Figure 8:
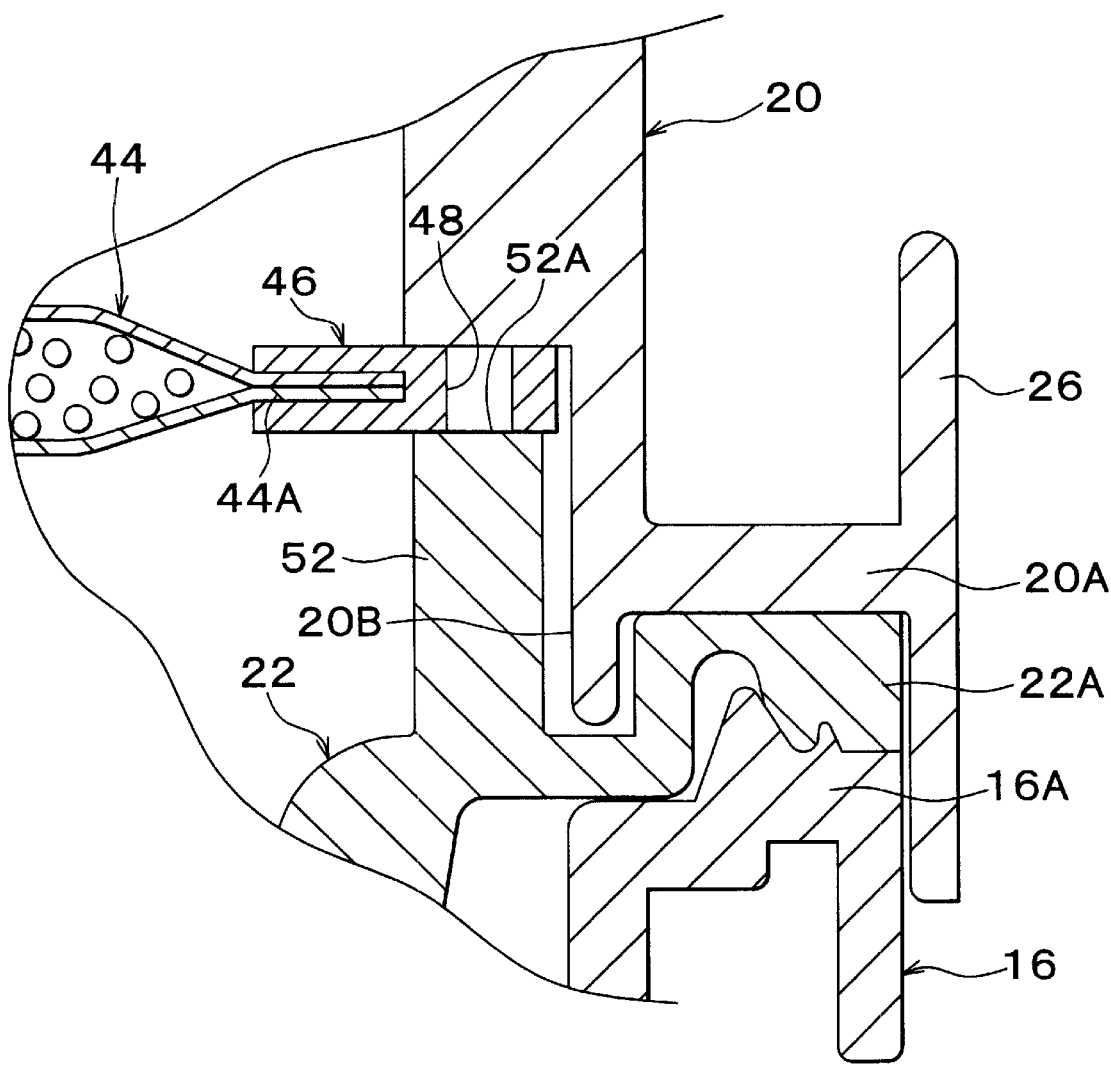
FIG. 8 is a enlarged sectional side view showing a main portion of an air cleaner according to one embodiment of the invention.

As shown in FIG. 8, a plug portion 52 is formed protruding toward the resin frame 46 of the adsorbent sheet 44 near the outer peripheral frame 22A on the element 22. Among the installation holes 48 formed in the resin frame 46 of the adsorbent sheet 44, an installation hole 48 in which the pin 32 provided vertically on the rib 30 is not fixed, or among installation holes 50, not shown, an installation hole 50 in which an engaging hook 31 is not engaged, is plugged by a upper surface 52A of the plug portion 52. The plug portion 52 is formed with a non-woven fabric such that when the pin 32 or the engaging hook 31 is fixed in the installation holes 48, 50, the plug portion 52 abutting against the pin 32 or the engaging hook 31 deforms easily.

Next, an operation of the present exemplary embodiment will be described.

Figure 2:
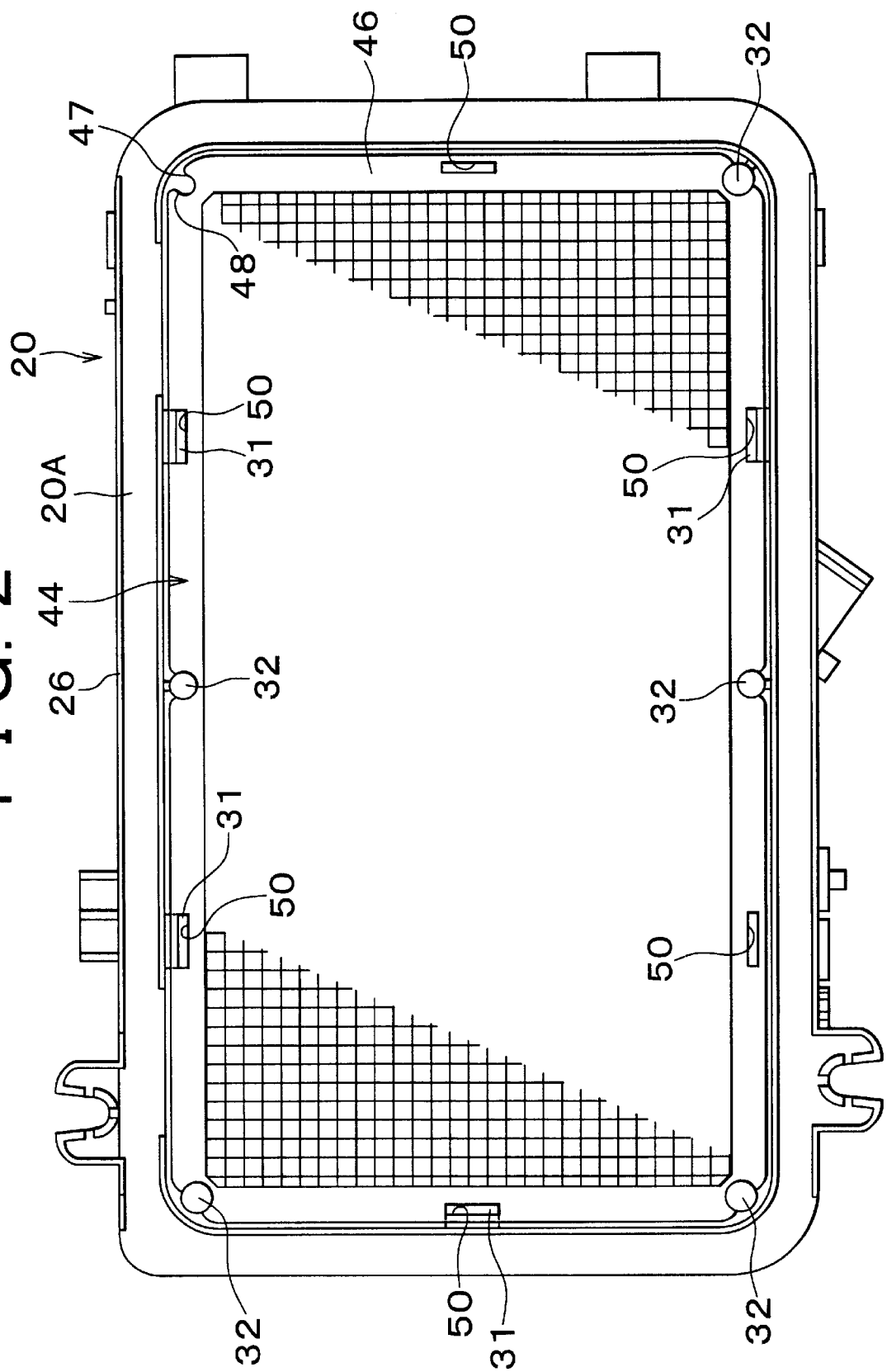
FIG. 2 is a plan view showing an upper housing and an adsorbent sheet of an air cleaner according to one embodiment of the invention.

According to the present exemplary embodiment, there is at least one more of both the installation holes 48 and the installation holes 50 provided in the resin frame 46 of the adsorbent sheet 44 than there are pins 32 and engaging hooks 31 respectively provided on the upper housing 20. Because of this, the pins 32 and the engaging hooks 31 provided on the upper housing 20 may be located anywhere so long as they correspond to one of the plurality of installation holes 48 and installation holes 50 in the adsorbent sheet 44, as shown in FIG. 2. As a result, a common adsorbent sheet 44 is able to be used with air cleaners 10 in which the locations of the pins 32 and engaging hooks 31 provided on the upper housing 20 differ.

Moreover, because there is at least one more of both the installation holes 48 and the installation holes 50 provided in the resin frame 46 of the adsorbent sheet 44 than there are pins 32 and engaging hooks 31 respectively provided on the upper housing, the adsorbent sheet 44 can be easily removed from the upper housing 20 when the adsorbent sheet 44 is to be recycled. This can be done using an installation hole 48 and an installation hole 50 which are not being used, by means such as engaging a tool in the installation hole 48 and/or the installation hole 50, for example.

Moreover, according to the present exemplary embodiment, among the installation holes 48, 50, an installation hole 48, 50 in which the pin 32 or the engaging hook 31 is not fixed is plugged by the plug portion 52 provided with the element 22. This prevents fuel vapor from leaking out from the installation holes 48, 50 in which the pin 32 or the engaging hook 31 are not fixed.

Although the invention has been described herein with reference to a specific embodiment, many modifications and variations therein will readily occur to those skilled in the art. Accordingly, all such variations and modifications are included within the intended scope of the invention. For example, in the foregoing exemplary embodiment the pin 32 and the engaging hook 31 are formed on the upper housing 20, which serves as the first housing. Alternatively, according to other embodiments, the pin 32 and the engaging hook 31 may be formed on the lower housing 16, which serves as the second housing.

Also, according to the foregoing exemplary embodiment, the installation hole 48 having the open portion 47 is formed in the resin frame 46 of the adsorbent sheet 44. According to other embodiments, however, the installation hole 48 may be formed as a round hole, without the open portion 47.

Moreover, according to the foregoing exemplary embodiment, the resin frame 46 is used as the frame. According to other embodiments, however, the frame is not limited to being the resin frame 46, but may be a frame of another material, such as a metal frame.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An air cleaner comprising:
   a housing divided into a first housing and a second housing, one of which is provided with a frame having a plurality of installation holes;
   an element fitted between the first housing and the second housing;
   an adsorbent sheet which is fixed within at least one of the first housing and the second housing, an outer periphery of the adsorbent sheet being retained by the frame, the adsorbent sheet being fixed within at least one of the first housing and the second housing so as to close an opening portion located at an optional position in the at least one of the first housing and the second housing; and a plurality of installation portions provided on at least one of the first housing and the second housing, which attach to the installation holes, wherein there is at least one more installation hole than there are installation portions.

2. An air cleaner comprising:

a housing divided into a first housing and a second housing, one of which is provided with a frame having a plurality of installation holes;

an element fitted between the first housing and the second housing;

an adsorbent sheet which is fixed within at least one of the first housing and the second housing, an outer periphery of the adsorbent sheet being retained by the frame; and a plurality of installation portions provided on at least one of the first housing and the second housing, which attach to the installation holes, wherein there is at least one more installation hole than there are installation portions, and the element includes a plug portion for plugging one of the installation holes in which the installation portion is not fixed.

3. The air cleaner according to claim 1, wherein the adsorbent sheet adsorbs a fuel vapor from an internal combustion engine.

4. The air cleaner according to claim 1, wherein each of the installation portions is a pin provided on an inner wall of at least one of the first housing and the second housing, and which is fixed in a corresponding one of the installation holes by heat caulking.

5. The air cleaner according to claim 1, wherein each of the installation portions is a hook provided on an inner wall of at least one of the first housing and the second housing, and which is fixed in a corresponding one of the installation holes by fitting therein.

6. The air cleaner according to claim 1, wherein each of the installation holes has an open portion.

7. The air cleaner according to claim 1, wherein the element is made from a non-woven fabric.

8. The air cleaner according to claim 2, wherein the element is made from a non-woven fabric.

9. The air cleaner according to claim 8, wherein the plug portion is formed with a non-woven fabric.

* * * * *

UNITED STATES PATENT AND TRADEMARK OFFICE
CERTIFICATE OF CORRECTION

PATENT NO.   : 6,592,655 B2
DATED        : July 15, 2003
INVENTOR(S)  : Akira Iriyama, Kouichi Oda and Takashi Nishimoto It is certified that error appears in the above-identified patent and that said Letters Patent is hereby corrected as shown below:

<u>Title page,</u>
Item [73], change "Toyoda Boshoku Corp., Toyoda (JP);" to -- Toyoda Boshoku Corp., Kariya (JP); --

Signed and Sealed this

Twenty-first Day of October, 2003

JAMES E. ROGAN
*Director of the United States Patent and Trademark Office*